Sept. 3, 1968   C. B. CAPERTON   3,399,416
SEWER RODDING EQUIPMENT
Filed July 14, 1966   5 Sheets-Sheet 1

INVENTOR.
CHARLES B. CAPERTON
BY
Paul + Paul
ATTORNEYS.

Sept. 3, 1968 C. B. CAPERTON 3,399,416
SEWER RODDING EQUIPMENT
Filed July 14, 1966 5 Sheets-Sheet 2

INVENTOR.
CHARLES B. CAPERTON
BY
Paul + Paul
ATTORNEYS.

Sept. 3, 1968  C. B. CAPERTON  3,399,416
SEWER RODDING EQUIPMENT
Filed July 14, 1966  5 Sheets-Sheet 3
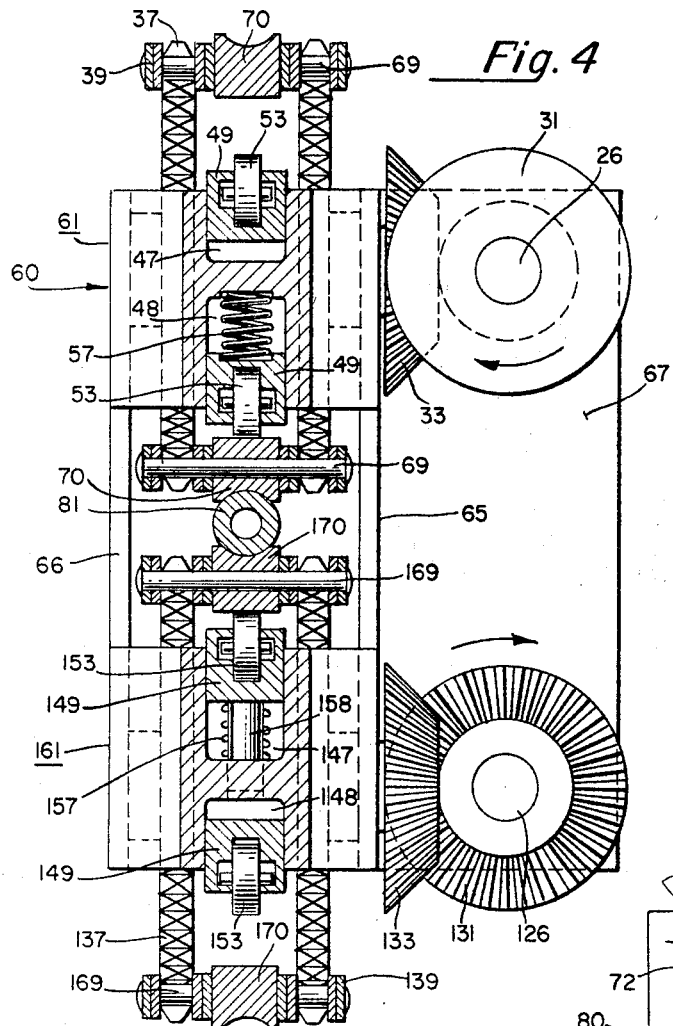
Fig. 4
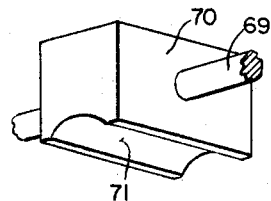
Fig. 6
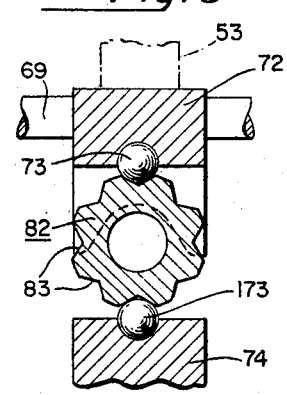
Fig. 8
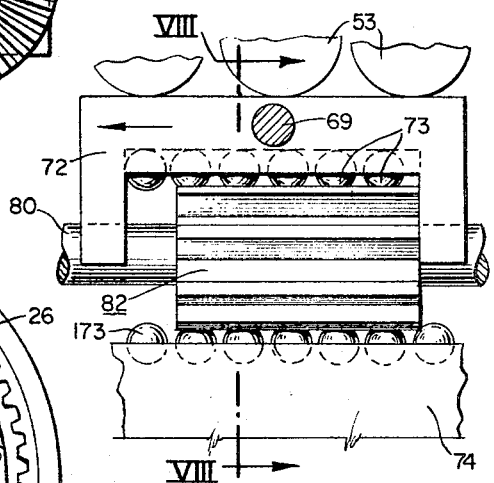
Fig. 7
Fig. 5
INVENTOR.
CHARLES B. CAPERTON
BY
Paul + Paul
ATTORNEYS.

Sept. 3, 1968    C. B. CAPERTON    3,399,416
SEWER RODDING EQUIPMENT
Filed July 14, 1966    5 Sheets-Sheet 4

INVENTOR.
CHARLES B. CAPERTON
BY
Paul + Paul
ATTORNEYS.

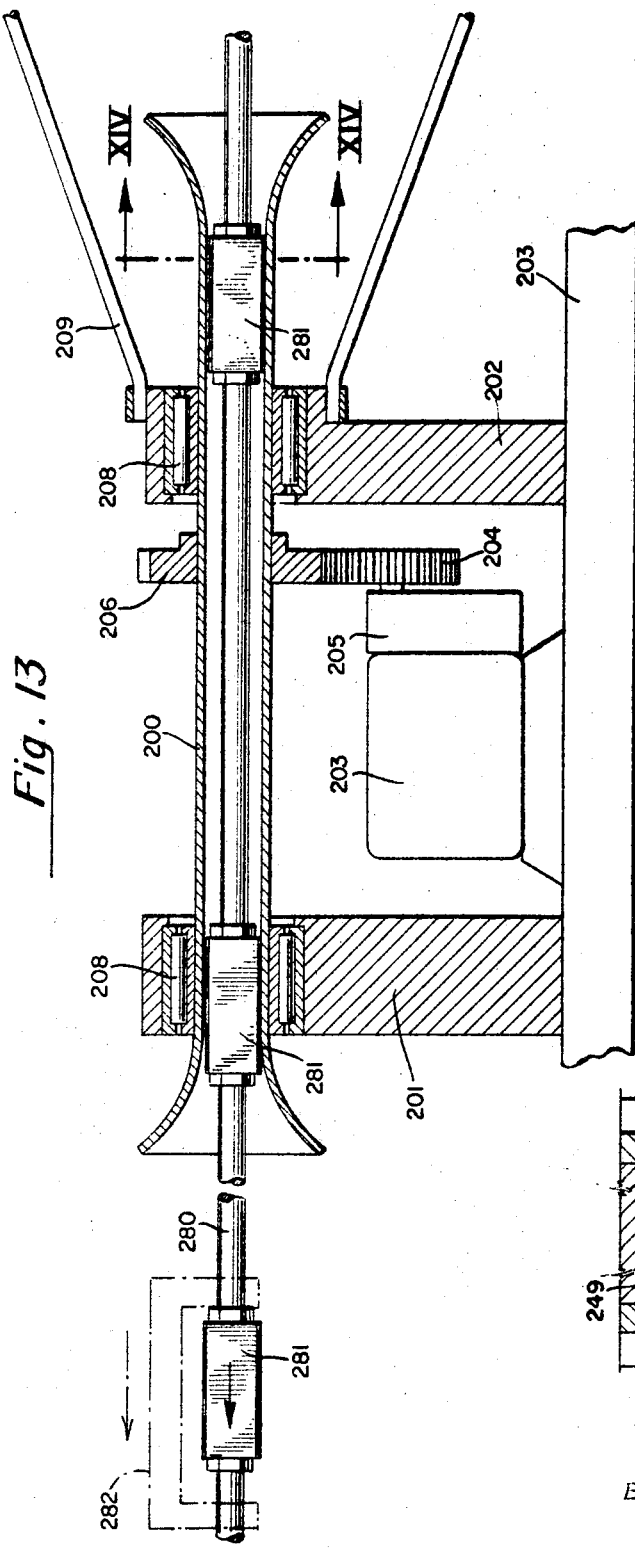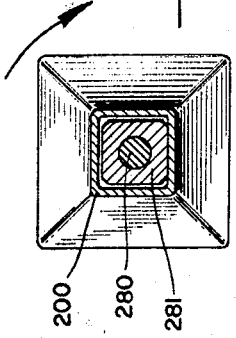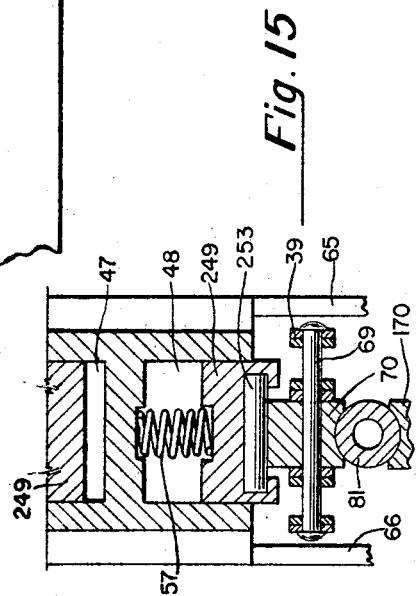

United States Patent Office 3,399,416
Patented Sept. 3, 1968

3,399,416
SEWER RODDING EQUIPMENT
Charles B. Caperton, Montgomery Court Apartments,
Narberth, Pa. 19072
Filed July 14, 1966, Ser. No. 565,281
14 Claims. (Cl. 15—104.3)

ABSTRACT OF THE DISCLOSURE

In a sewer rodding machine, pressure means squeeze the rod couplers from top and bottom to prevent axial rotation thereof relative to the squeeze means, to prevent twist from running back into the storage cage. To turn the tool into the obstruction, the squeeze means are rotated. The squeeze means are also driven in the lengthwise direction of the rod to drive the rod forwardly, or rearwardly.

---

This invention relates to rodding equipment of the type used in cleaning and maintenance of sewer pipes, water pipes, and other underground conduits and structures. Such pipes, conduits, and the like are cleared of obstructions by feeding into the pipe steel rod having at its foremost extremity a suitable tool for performing a particular cutting or other clearing operation. Such tool may be an auger bit, a root saw, a pickup, or any other of a large variety of tools.

While the rod to which the cutting tool is attached may be a continuous length of rod, in many cases it is comprised of a string of individual rods of spring steel stock coupled together by couplings. In a typical case, each rod is about 39 inches long. The coupled rod is stored coiled in a cage or reel which is rotatably mounted on the rodding machine and ordinarily located at the rear of the machine.

It is, of course, necessary to push the tool into the pipe and to withdraw the tool from the pipe. For these purposes, some form of power drive is provided on the rodding machine to move the rod in its lengthwise directions.

In order for the tool, particularly a cutting tool, to be effective, it is necessary for the rod to be rotated axially, and some form of power drive for this purpose is also provided on the rodding machine.

If, as the rotating tool progresses forwardly into the pipe, an obstruction is encountered, such obstruction will oppose rotation of the tool, and, as a result, the speed of rotation of the tool will be reduced to a speed lower than that at which the rod is being turned at the machine end. As a consequence, a torsional stress is imposed on the rod, and a twist will tend to run back along the rod from the forward tool end all the way to the coiled rod in the storage reel. This twist, if it enters the storage reel, will distort the loops of stored rod and will, particularly in the case of a coupled rod, tend to cause entanglement thereof.

In my copending patent application, Ser. No. 549,762, filed Apr. 29, 1966, entitled "Sewer Rodding Machine," means are described and claimed for isolating the storage reel from the torsional stress and twisting forces referred to above. The means described in that application comprise a peripheral surface, preferably in the form of a torsion-taking wheel, mounted on the machine and about which the rod is looped and confined.

The present application is directed to a different form of means for isolating the torsional twist or stress, generated by the obstructed or partially obstructed tool, from the coiled rod in the cage reel. In some forms, the new twist barrier may, if desired, also be used for driving the coupled rod in a longitudinal direction. Essentially, the new twist-barrier means, in one form at least, involves means for squeezing the coupler and/or the rod to prevent the twist from going beyond the squeeze point. The drive means for driving the rod in its lengthwise direction may be provided by known forms of drive, or may be provided by the squeeze means of the present invention.

In another form, the coupler is made other than circular in cross section, for example square, and is prevented from rotating on its own axis relative to the isolation means, by means, such as a tube or a channel, through which the coupled rod passes and which is shaped to prevent rotation of the coupler relative to the tube or channel.

The purpose of the present invention is then to provide in a rodding machine for sewers and the like, means for isolatng or substantially isolating the storage reel from the torsional stress and twisting forces which tend to be set up in the coupled rod as the coupled rod is driven rotationally into an obstruction in the sewer or other pipe.

It is a further purpose of the present invention to provide, in a rodding machine, twist-barrier means which, in addition to isolating the twist, will also function as the driving means for driving the coupled rod in its lengthwise direction.

The present invention will be clearly understood from the following detailed description of several forms selected for illustration in the drawing, in which:

FIG. 4 is a front elevational view, in section, as seen along the line IV—IV of FIG. 1 looking in the direction of the arrows showing, among other things, the sprockets and chains carrying the pressure or squeeze blocks which prevent rotation of the couplers;

FIG. 5 is an elevational view, in section, as seen looking along the line V—V of FIG. 1 in the direction of the arrows showing some of the gearing for driving the sprockets and chains;

FIG. 6 is a perspective view of one of the pressure or squeeze blocks;

FIG. 7 is a side elevational view, partly broken away, of a modified form showing a modified form of coupler and a different form of pressure block;

FIG. 8 is a view, in section, along the line VIII—VIII of FIG. 7 showing the modified form of coupler of FIG. 7.

FIG. 13 is a side elevation of a guide tube, the interior of which is shaped to prevent rotation of the coupler on its own axis;

FIG. 14 is a view, in section, along the line XIV—XIV of FIG. 13;

FIG. 15 is a view, in section, similar to a portion of FIG. 4 but illustrating another form of roller for applying pressure to the squeeze blocks.

Figure 1:
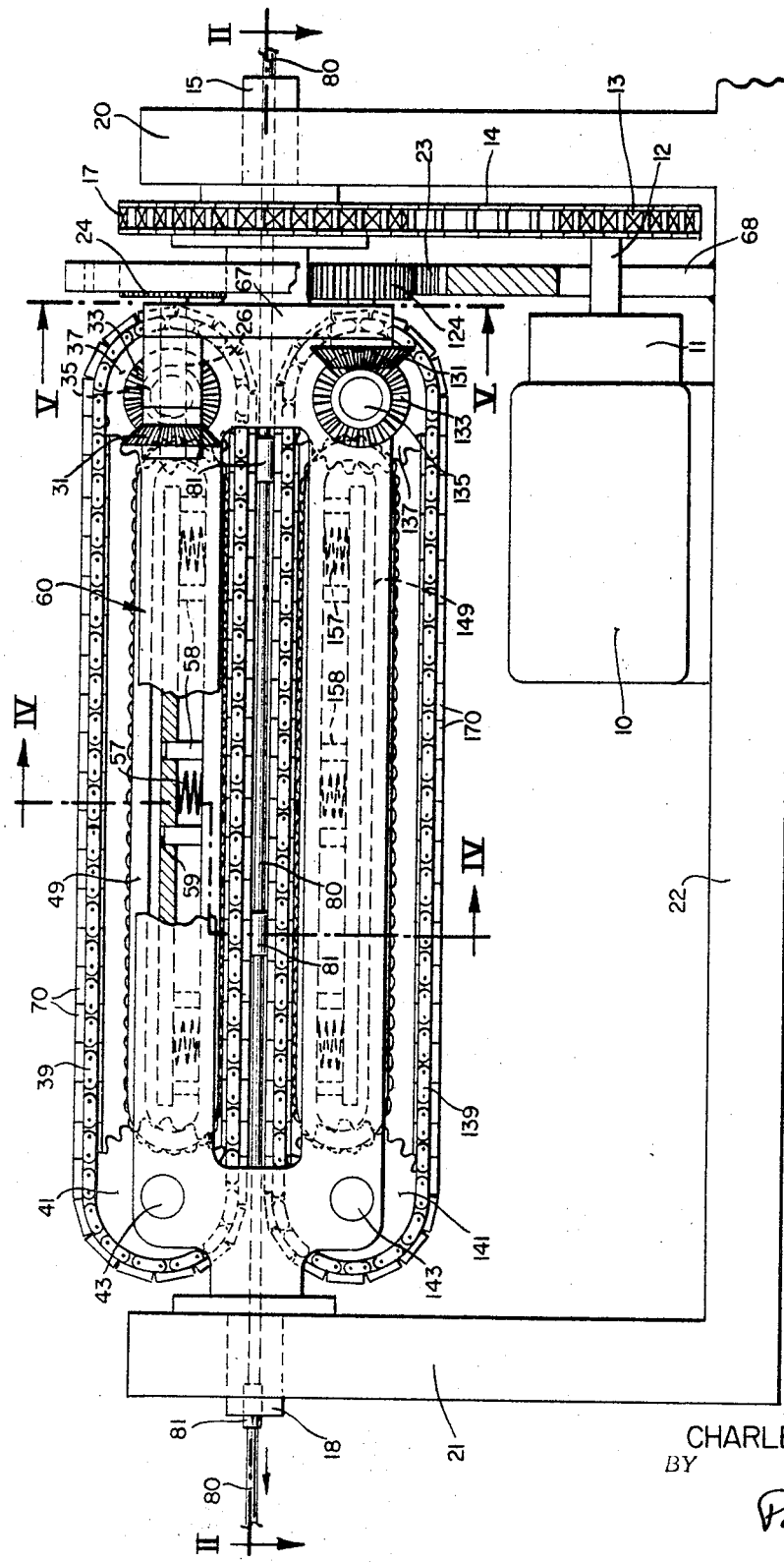
FIG. 1 is a side elevational view of one form of squeeze drive for coupled rods which will prevent the twist on the rod from running back into the cage reel and which, if desired, may also be used for driving the coupled rod in its lengthwise directions.

Referring now to the drawings, FIGS. 1–6 illustrate one form of squeeze drive adapted to prevent the twist which is introduced into the coupled rod, when the tool encounters an obstruction, from running back into the coiled rod in a storage reel. The squeeze drive shown in FIGS. 1–6 can also be used to drive the coupled rod in its lengthwise directions into and out of the sewer or other pipe to be cleared.

In FIG. 1, the storage reel is not shown but may be assumed to be located to the right of the structure shown. Such reel, for example, may be of the type shown in my U.S. Patent No. 3,039,715, granted June 19, 1962.

In FIG. 1, the squeeze drive of the present invention is shown supported between two spaced-apart uprights or standards 20 and 21 mounted on a base 22. Supported for rotation in each standard 20 and 21 is a flanged hub member 15 and 18, respectively, each of which has a coaxial bore extending therethrough through which the coupled rod 80 passes. Bearings 16 and 19 support the hub members 15 and 18 for rotation, and the flange portions of the hub members function as thrust bearings and spacers.

The flange portion of hub member 15 is enlarged and its peripheral surface is provided with sprocket teeth forming the sprocket 17 for receiving sprocket chain 14 which, in FIG. 1, is illustrated as being driven by a reversible motor 10, reduction gearing 11, drive shaft 12, and drive sprocket 13. Thus, the hub member 15 also functions as the drive sprocket 17 for driving rotationally the double H-frame 60, which will now be described.

Figure 2:
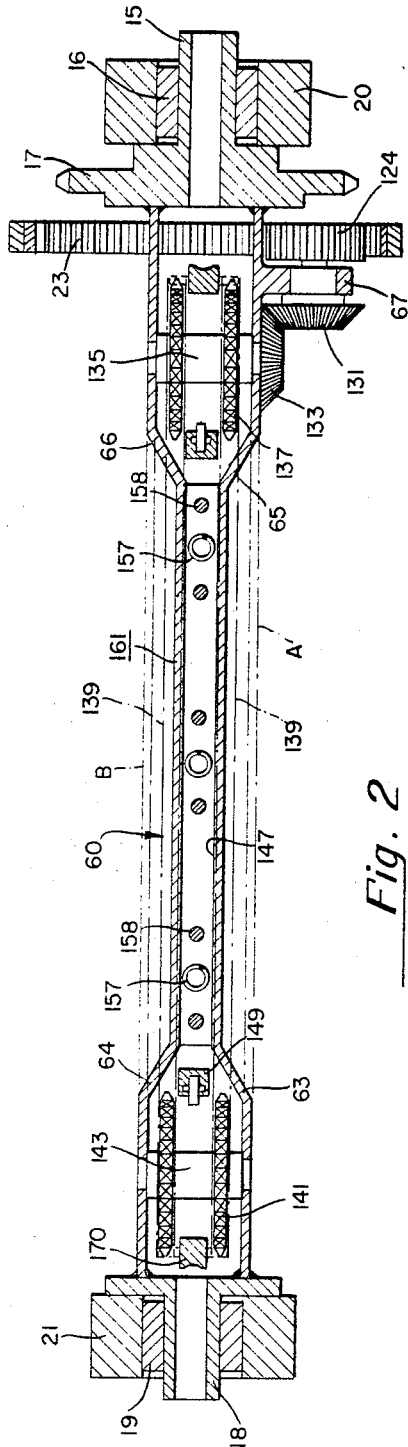
FIG. 2 is a plan view, in section, looking down along the line II—II of FIG. 1 in the direction of the arrows showing the lower half of the double H-frame which supports the squeeze drive.
Figure 3:
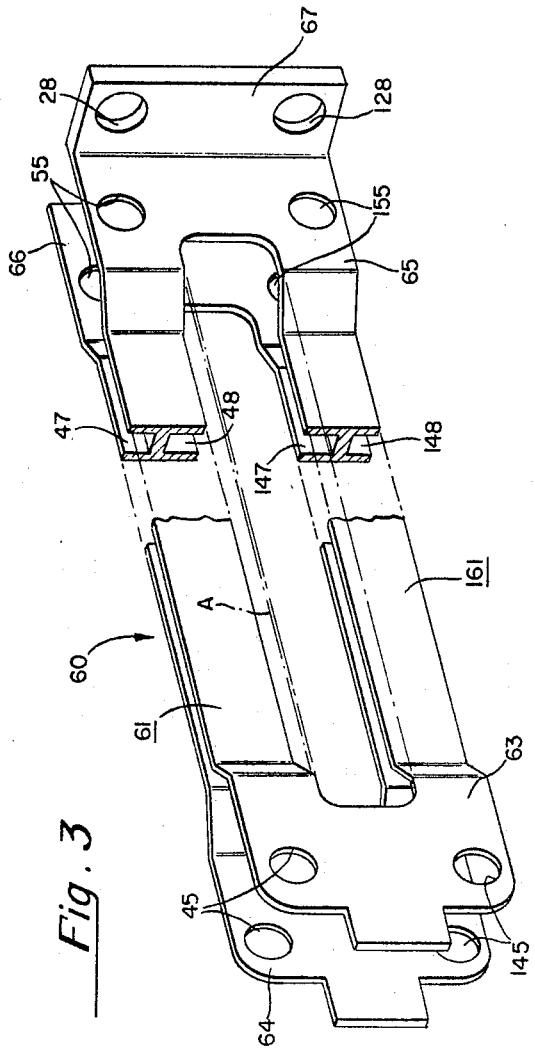
FIG. 3 is a perspective view of the double H-frame.

The double H-frame 60, shown in perspective in FIG. 3, and in section in FIG. 2, includes a first or upper H-frame portion 61 and a second or lower H-frame portion 161, disposed parallel to each other and joined togther at each end by an integral Y-connecting portion, identified by the reference numerals 63 and 64 at the left end and 65 and 66 at the right end, as viewed in FIG. 3. Each of these Y-portions joins a side plate of the upper-H-frame with a side plate of the lower H-frame. One of the Y-portions, portion 65 in FIG. 3, has a lateral extension 67. The spacing between the Y-portions is greater than between the side plates of the H-portions. The center portions of the Y portions at each end of the double H-frame may be joined, if desired. For example, Y portion 63 may be joined to Y-portion 65 by the strip A, indicated in phantom in FIGS. 2, 3 and 4, and Y-portion 64 may be joined to the Y-portion 66 by a corresponding strip B. The strips A and B may be used to prevent lateral movement of the conveyor belts or chains 39 and 139.

Mounted on base 22, as by welding, in front of standard 20 is a fixed housing 68, the upper end of which is circular and internally cut forming the internal spur gear 23, as seen in FIG. 5. Meshing with the teeth of the internal spur gear 23 are two pinion gears 24 and 124 fixed to shafts 26 and 126, respectively, which extend through and are supported for rotation by bearings press-fitted into the holes 28 and 128 in the lateral arm 67.

Affixed to the forward end of each of the pinion shafts 26 and 126 is a bevel drive gear 31 and 131, respectively. The bevel gears 31 and 131 mesh with bevel gears 33 and 133 fixed to shafts 35 and 135, respectively, the shafts 35 and 135 being disposed laterally at right angles to the pinion shafts 26 and 126. The shafts 35 and 135 of the lateral bevel gears 33 and 133 extend laterally through sets of aligned holes 55 and 155 provided in the Y-portions 65 and 66, these sets of holes being clearly seen in FIG. 3. The lateral shafts 35 and 135 are supported for rotation in bearings which are press-fitted into the sets of holes 55 and 155.

As viewed in FIG. 1, the upper pinion shaft 26 is substantially longer than the lower pinion shaft 126 so that the bevel gear 31 at the forward end of the upper shaft 26 engages the lateral bevel gear 33 on the left side thereof, as viewed in FIG. 1, whereas the bevel gear 131 at the forward end of the shorter pinion shaft 126 engages the bevel gear 133 on the right side thereof. By this arrangement, the bevel gears 33 and 133 are driven in the same rotational direction when the double H-frame is rotated. This will be clear when the operation of the squeeze drive means is described hereinbelow.

Fixed on lateral shaft 35 is a double sprocket 37, and fixed on lateral shaft 135 is a double sprocket 137.

At the other end of the double H-frame, sets of holes 45 and 145 are provided, as seen in FIG. 3, through which extend lateral shafts 43 and 143, these shafts being supported in the sets of holes 45 and 145 by press-fitted bearings. Affixed on the upper lateral shaft 43 is a double sprocket 41 and fixed on the lower lateral shaft 143 is a double sprocket 141. A double chain 39 loops about the upper set of sprockets 41 and 37, and similarly, a double chain 139 loops about the lower set of sprockets 141 and 137.

Looped about the upper H-frame 61 and disposed within the channels 47 and 48 thereof (see FIG. 3) is a continuous loop raceway 49, as seen in cross section in FIG. 4. A similar continuous loop raceway 149 is looped about and disposed within the channels 147 and 148 of the lower H-frame 161.

The continuous loop raceway 49 is filled with a plurality of pressure rollers 53. These rollers 53 are captive in, but are free to move around, the loop of the raceway 49 and they do so when they are frictionally engaged by the chain-driven pressure or squeeze blocks 70, as will be later described.

As shown in FIGS. 1 and 4, a plurality of heavy coil compression springs 57 are placed at spaced-apart intervals in the lower channel 48 of the upper H-frame 61 between the undersurface of the cross rib and the upper surface of the raceway 49. In FIG. 1, three such compression springs 57 are shown. A plurality of alignment or guide pins 58 are provided for guiding the up and down movement of the lower loop of the raceway 49 relative to the H-frame 61. These alignment pins 58 enter guide holes 59 provided in the cross rib of the H-frame 61 at corresponding spaced intervals.

Secured to the double chain 39 on cross pins 69 spaced at regular intervals are pressure or squeeze blocks 70 of steel or other suitable metal. The squeeze blocks 70 are of generally rectangular configuration and have an arcuate undersurface 71, preferably shaped to mate with the couplers 81 of the coupled rod 80. The squeeze blocks 70 are so spaced that they abut one another in end-to-end relation as they are carried along the level portions of the continuous loop described by the movement of the sprocket chain 39.

The lower half of the squeeze apparatus shown in FIGS. 1–5, below the path of the rod 80, is substantially identical to that of the upper half and, accordingly, it will not be necessary to describe the lower half in detail. Component parts in the lower half which are similar to those in the upper half and which have not been hereinabove specifically referred to, are identified by the same reference numeral plus 100. Another form of pressure roller, identified as 253, is illustrated in FIG. 15, later described.

The operation of the machine will now be described.

The tubular hub 15, having peripheral sprocket teeth forming the sprocket 17, is driven rotationally by means of the reversible motor 10, reduction gearing 11, shaft 12, drive sprocket 13 and chain 14. For convenience of description, assume that the drive is in such direction that the hub 15 is being driven clockwise as viewed in FIG. 1 looking from the reel and toward the forward end of the machine, i.e., looking from right to left in FIG. 1. The double H-frame 60 is then rotating clockwise, as viewed from the right in FIG. 1, being supported at the forward end of the machine by the hub 18. The coupled rod 80 extends from the cage reel, not shown, but assumed located to the right of the drawing in FIG. 1, through the bore of the hub 15, through the space between the Y-portions 65 and 66, through the open area between the upper and lower H-frames 61 and 161, through the space between the Y-portions 63 and 64, and through the bore of the forward hub 18. With the double H-frame 60 rotating clockwise, as viewed looking in from the right in FIG. 1, the frame is rotating counterclockwise as viewed in FIG. 5, and, accordingly, the pinion shafts 26 and 126, which are mounted in the holes 28 and 128 of the lateral extension 67, are in FIG. 5 being driven counter-clockwise, about the axis of the machine, as represented by the center axis of the hubs 15 and 18.

Counter-clockwise movement of the pinion shafts 26 and 126 about the axis of the machine causes the pinions 24 and 124 to rotate clockwise on their respective pinion shafts, as viewed in FIG. 5. This drives the bevel gears 33 and 133 in the clockwise direction, as viewed in FIG. 1, and since the double sprockets 37 and 137 are fixed to the shafts 35 and 135 of the bevel gears 33 and 133, the double sprockets 37 and 137 are driven clockwise, as viewed in FIG. 1.

It will be seen that as the upper chain 39 moves clockwise about its loop path, the pressure blocks 70 in the upper part of the loop move rearwardly and downwardly, and that as they approach the axis of the coupled rod 80, the upper surface of a coupler 81 will be engaged by the arcuate undersurface of at least one of the pressure blocks 70 of the upper chain 39. In a similar manner, the undersurface of the same rod coupler 81 will be engaged by the arcuate upper surface of one of the pressure blocks 170 of the lower chain 139. As the chains 39 and 139 leave the sprockets 37 and 137, respectively, the flat upper surface of the pressure or squeeze blocks 70 of the upper chain 39, and the flat undersurface of the pressure or squeeze blocks 170 of the lower chain 139, will come into contact with one or more of the pressure rollers 53 and 153 of the upper and lower raceways 49 and 149, respectively, and the upper raceway 49 will be forced upward compressing the heavy compression springs 57 and the lower raceway 149 will be forced downward compressing the lower compression springs 157. By the means just described, a heavy downward pressure will be placed on the squeeze blocks 70 of the upper chain 39 and a heavy upward pressure will be placed on the squeeze blocks 170 of the lower chain 139, thus squeezing the coupler 81 between the upper and lower blocks to such an extent that rotation of the coupler within the squeeze blocks is prevented.

The length of the upper and lower raceways 49 and 149 is greater than the spacing between successive couplers 81 so that at least one coupler is always being squeezed by the upper and lower pressure blocks. In this manner, rotation of the rod 80 about its own axis relative to the squeeze blocks is prevented, and hence the mechanism just described is effective to prevent twist from running back into the cage reel of the machine.

If the rod 80 is not straight, successive couplers 81 may not be coaxially aligned, and a lateral force component may be exerted on the endless chains 39 and 139 at the location of the coupler being squeezed between the blocks 70 and 170. In such case, lateral movement of the chains 39 and 139 may be prevented by the strips A and B of the double H-frame.

It is to be understood that since the double H-frame is being rotated about its longitudinal center axis, the couplers 81 and rod 80 are being rotated on their own axis by the rotation of the squeeze blocks, thereby rotating the tool at the forward end of the rod. In addition to driving the rod rotationally, the squeeze mechanism shown in FIGS. 1–6 may also be used for driving the rod in its lengthwise directions. Thus, no other drive means is required. However, in some cases, it may be desirable to use the squeeze means of FIGS. 1–6 merely to isolate the twist from the reel cage and to use another form of drive to drive the coupled rod.

A modified form of squeeze and drive means is illustrated in FIGS. 7 and 8. In FIGS. 7 and 8, in lieu of the squeeze blocks 70 and 170 of FIGS. 1–6, U-shaped dogs 72 are employed. These dogs 72 are suitably spaced on cross pins 69 of chain 39 to converge with the spaced-apart couplers 82 of the coupled rod 80 as the rod moves through the squeeze and drive means. Captive in the undersurface of the dog 72 between its depending legs is a series of steel balls 73. Below the path of the rod 80 is a fixed bar 74 which extends the length of the upper raceway. In the upper surface of bar 74 is a series of captive steel balls 173. In operation, the dogs 72 are secured to the upper chain 39, as by the cross pins 69, and, as the dogs are carried from the upper level portion of the loop down and around, they approach the path of the rod 80, and one of the dogs will converge with and engage the coupler 82, as shown in FIG. 7. As the dog 72 moves through the straightaway portion of the loop below the raceway 49, the upper surface of the dog will come into contact with, and will be pressed downwardly by the pressure rollers 53 of the raceway 49, in a manner similar to that shown and described in connection with the species shown in FIGS. 1–6. In the form shown in FIGS. 7–8, the couplers 82 are provided with a plurality of axially extending grooves 83, equally spaced about the peripheral surface of the coupler, as seen clearly in cross section FIG. 8. The coupler 82 is thus squeezed between the upper and lower steel balls 73 and 173 and rotation of the coupler 82 relative to the dog 72 is prevented. In FIG. 7, the coupler 82 and the rod 80 is shown to be driven forwardly by the rearwardly depending leg of the dog 72 which abuts against the rear end surface of coupler 82. The dog 72 is generally similar to that shown in FIG. 9 of my U.S. Patent 3,146,476, the depending legs of the dog being arched to fit over the rod 80. It will be understood that when the drive is reversed to drive the rod in the opposite direction to return the rod to the cage reel, the forward leg of the dog will engage the forward end surface of the coupler.

Figure 9:
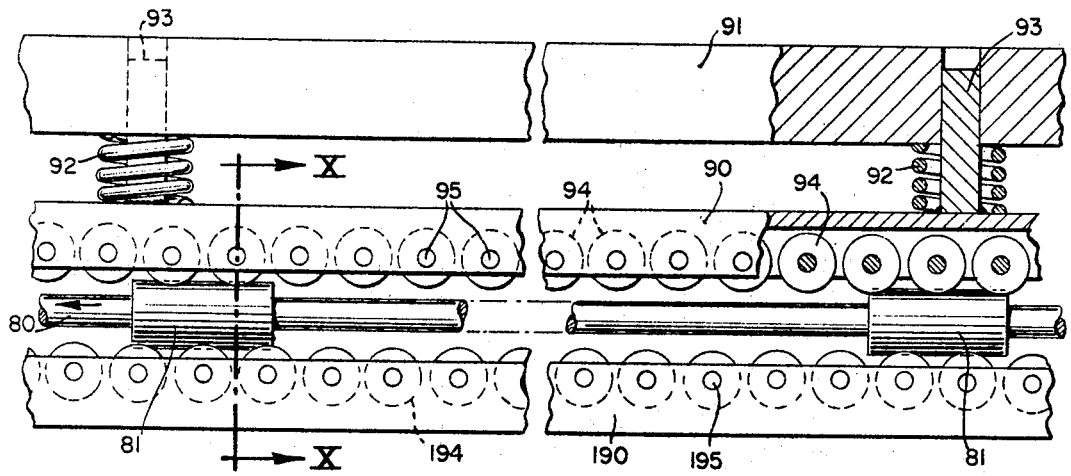
FIG. 9 is a side elevational view, broken away, of yet another modification in which pressure rollers are employed to squeeze the couplers.
Figure 10:
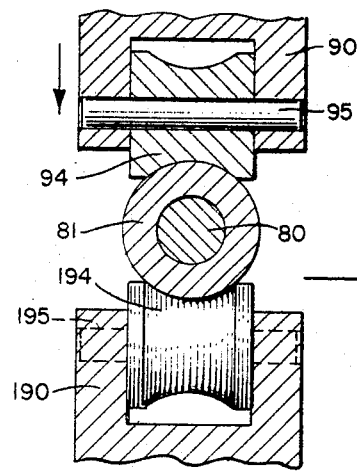
FIG. 10 is an end view, in section, looking along the line X—X of FIG. 9.

FIG. 9 illustrates another modification. In FIG. 9, a pressure channel member 90 is supported below a fixed frame 91 and is spring-pressed downwardly by a series of heavy compression springs 92, guided by alignment pins 93. Fixed in the channel member 90 on axles 95 and protruding therebelow are a series of steel rollers 94 having concave arcuate surfaces adapted to mate with the exterior surface of the couplers 81, as seen in cross section in FIG. 10. The understructure below the path of the rod 80 includes a fixed channel member 190 supported from a fixed frame member, not shown. Protruding from the upper edges of the channel member 190 is a series of steel rollers 194 having an arcuate surface similar to that of the rollers 94. The means shown in the species of FIGS. 9 and 10 is adapted only to squeeze the couplers 81 to prevent rotation thereof. To drive the coupled rod in its lengthwise directions, any suitable known form of drive may be used. Such drive may be placed either rearwardly of, or forwardly of, the squeeze means shown in FIGS. 9 and 10. If desired, means generally similar to that shown in FIGS. 9 and 10 may be mounted along the curving path of the rod between the peripheral area of the coiled rod stored in the cage reel and the center axis of the machine. For example, a portion of the guide tube 31A shown in FIG. 5 of my U.S. Patent 3,077,314, granted Feb. 12, 1963, entitled "Rod Reel," may be removed and squeeze means similar to that shown in FIGS. 9 and 10 may be supported at one end for rotation about the center axis of the machine, the other end extending toward the storage reel in cantilever fashion. The upper and lower plates, such as 91 and a corresponding lower plate (not shown) may be reinforced against the forces tending to spread them apart as by yoke members, or other clamp means.

Figure 12:
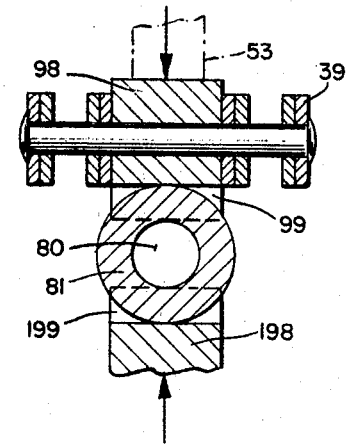
FIG. 12 is an end view, in section, looking along the line XII—XII of FIG. 11.
Figure 11:
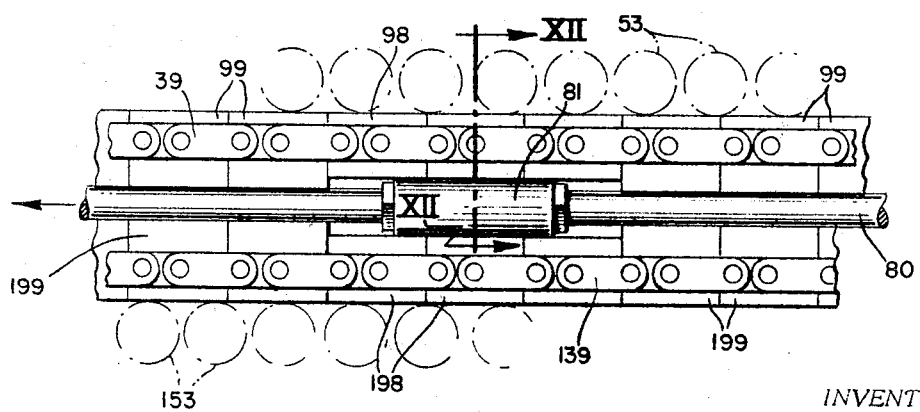
FIG. 11 is a side elevational view, in section, partly broken away, showing yet another modification in which the undersurfaces of the pressure or squeeze blocks are flat, rather than arcuate, and in which some of the pressure blocks are long for engaging the rod itself, and others are short for engaging the couplers.

FIGS. 11 and 12 illustrate yet another modification. In the modification of FIGS. 11 and 12, the squeeze mechanism is generally similar to that shown in FIGS. 1–6 with the exception of the squeeze blocks. In FIGS. 11 and 12, the squeeze blocks are of two radial different lengths, that is, they extend for two different lengths toward the rod, a longer length for squeezing the rod itself and a shorter length for squeezing the couplers. The shorter squeeze blocks have arcuate squeeze surfaces, for squeezing the couplers, while the longer squeeze blocks have flat surfaces for squeezing the rod. In FIGS. 11 and 12, the shorter blocks are identified by the reference numerals 98 and 198 while the longer blocks are identified by the numerals 99 and 199. They are arranged in proper sequence on chains 39 and 139 to meet with the couplers 81 and rod 80.

Yet another form of means for preventing the twist on the rod from running back into the storage reel is illustrated in FIGS. 13 and 14. In FIGS. 13 and 14, a flared twist-barrier tube 200 is shown supported for rotation, as by bearings 208, in a pair of uprights or standards 201 and 202 mounted on base 203. The tube 200 is illustrated as being driven rotationally by the reversible motor 203 driving the gear 204 through suitable reduction gearing 205. The gear 204 meshes with a gear 206 fixed to the tube 200.

The interior of tube 200 has a cross-sectional shape which will accept the coupler 281 for passage therethrough but will not allow it to turn while in the tube. In the form illustrated in FIGS. 13 and 14, the tube 200 and the couplers 281 are square in cross section, and of approximately the same size, with the corners of the couplers beveled to aid the entry of the couplers into the tube. The means shown in FIG. 13 is suitable for preventing rotation of the rod 280 and couplers 281 relative to the tube 200, but is not suitable for driving the coupled rod 280 in its lengthwise directions. Any known form of drive means may be combined with the twist-barrier tube 200. In FIG. 13, a dog 282 is shown in phantom as engaging the coupler 281. The dog 282 may be carried by a suitable drive chain of known construction.

In lieu of the tube 200, a three-sided channel member of square or other non-circular cross section may be used to prevent rotation of couplers having corresponding cross sectional shape.

In FIG. 13, the cage 209 is shown as fixed. The cage may, however, be mounted for free rotation, as in FIG. 5 of my Patent 3,077,314. Also the twist-barrier tube may be located on the curved path of the rod as it moves toward the center axis of the machine from the peripheral region of the storage reel. Thus, the twist-barrier tube may replace a part of, or all of, the guide tube 31A shown in FIG. 5 of my aforesaid Patent 3,077,314.

It will be understood that once the coupled rod 280 is threaded through the tube 200, the succeeding couplers 281 will have little trouble in entering the tube. This is due to the fact that, even if the rod is twisted, a succeeding coupler will be oriented at almost the same angular position as the immediately preceding coupler. For, while there may be so much twist in a long length of the rod 280 that remote couplers are disposed at substantially different angular positions relative to each other, there will be but little difference in the angular positions of succeeding couplers, and such small difference will be corrected as the second coupler is pulled into the flared opening of the tube 200.

I have illustrated and described a number of structural forms for achieving my purpose of isolating the twist from the storage reel. Other forms may be used, within the concept of the present invention. For example, in lieu of the form of pressure rollers 53 and 153 illustrated in FIG. 4, the pressure rollers may preferably take the more usual form of roller bearing shown in FIG. 15, identified by the reference numeral 253. In that case, the continuous loop raceway would take the form shown in FIG. 15, and identified as 249. Other modifications, within the spirit and claims of the present invention, will occur to those skilled in the art.

What is claimed is:

1. In a rodding machine having storage means for storing coupled rods in coiled form, twist barrier means supported on said machine for preventing the twist which tends to be developed in the coupled rod during a clearing operation from running back into the coiled loops in said storage means, said twist barrier means comprising lateral confining means interposed along the path of said rod forward of said storage means and through which said coupled rod is passed longitudinally, said confining means confining said rod couplers laterally and preventing rotation of the rod couplers relative to said confining means.

2. Apparatus as claimed in claim 1, characterized in that said confining means includes opposed squeeze means for squeezing said couplers therebetween to prevent rotation thereof relative to said squeeze means.

3. Apparatus as claimed in claim 2 characterized in that the contact surface of said squeeze means is contoured to mate with the surface of the rod coupler to prevent rotation therebetween.

4. Apparatus as claimed in claim 2 further characterized in that said squeeze means includes roller means.

5. Apparatus as claimed in claim 2, characterized in that said squeeze means includes a supporting frame; squeeze blocks; at least one continuous loop chain mounted on said frame for carrying said squeeze blocks about a loop path a portion of which parallels the path of said coupled rod; a loop raceway supported in said frame within the loop of said continuous chain; pressure rollers captive in said loop raceway but free to move therealong; and means mounted between said supporting frame and said loop raceway for urging said raceway and pressure rollers against said squeeze blocks to press said squeeze blocks laterally against the rod couplers.

6. Apparatus as claimed in claim 5 further characterized in that said supporting frame is mounted for rotation about said rod path.

7. Apparatus as claimed in claim 6 characterized in that said squeeze means includes opposed squeeze blocks carried by oppositely disposed loop chains and pressed against opposing sides of said rod couplers by opposing pressure rollers disposed in oppositely disposed loop raceways and urged against said squeeze blocks by opposing spring means.

8. Apparatus as claimed in claim 7 characterized in that the surfaces of said squeeze blocks which engage said rod couplers are contoured to mate with the surface of said couplers.

9. Apparatus as claimed in claim 1 characterized in that said confining means comprises a tubular structure mounted on said rodding machine and through which the coupled rod is passed, the interior cross-sectional shape of said tubular structure allowing passage of the rod couplers therethrough but preventing axial rotation of the couplers relative to the tubular structure.

10. In rodding apparatus having coupled rod and means for moving said coupled rod in its lengthwise direction, restriction means adjacent the path of said moving rod for engaging the couplers of the coupled rod for restricting rotation of the coupled rod on its own axis relative to said restriction means while allowing movement of said rod in its lengthwise direction.

11. Apparatus as claimed in claim 10 characterized in that said restriction means includes opposed pressure contact means engaging the rod couplers.

12. Apparatus as claimed in claim 11 further characterized in that means are included for moving said pressure contact means in the lengthwise direction of said rod, thereby to move said rod in its lengthwise direction.

13. Apparatus as claimed in claim 12 further characterized in that said pressure contact means is adapted to contact the rod couplers and also the rod itself.

14. Apparatus as claimed in claim 8 characterized in that said means for urging said raceway and pressure rollers against said squeeze box includes spring means.

References Cited
UNITED STATES PATENTS

| | | | |
|---|---|---|---|
| 1,904,885 | 4/1933 | Seeley. | |
| 2,383,843 | 8/1945 | Blanc | 15—104.3 |
| 2,659,540 | 11/1953 | Sketchley | 15—104.3 |
| 3,106,734 | 10/1963 | Siegal | 15—104.3 |
| 3,242,518 | 3/1966 | Prange | 15—104.3 |
| 3,293,681 | 12/1966 | Siegal | 15—104.3 |

EDWARD L. ROBERTS, *Primary Examiner.*